March 17, 1964 J. R. FOSTER 3,125,152
TIRE MOUNTING APPARATUS
Filed June 8, 1961 2 Sheets-Sheet 1

INVENTOR
JAMES R. FOSTER
BY
*Lowell & Henderson*
ATTORNEYS

March 17, 1964
J. R. FOSTER
3,125,152
TIRE MOUNTING APPARATUS
Filed June 8, 1961
2 Sheets-Sheet 2
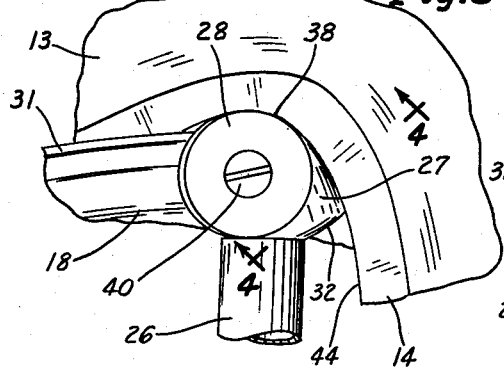
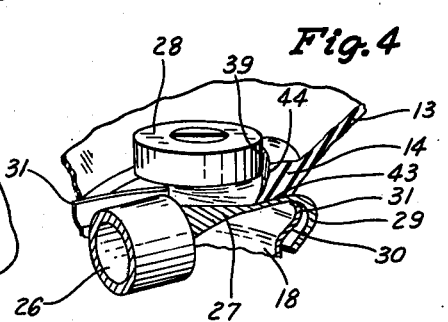
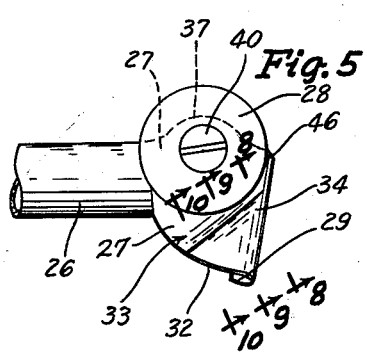
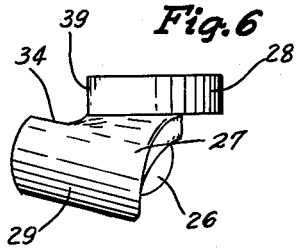
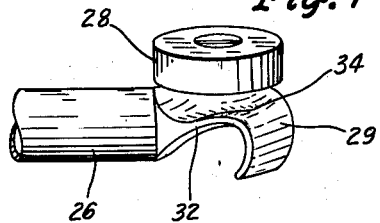
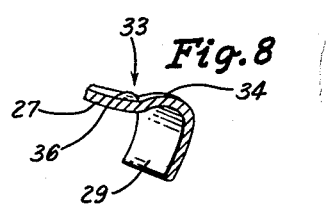
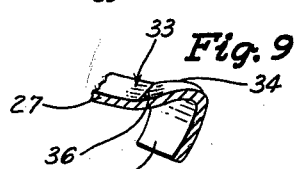
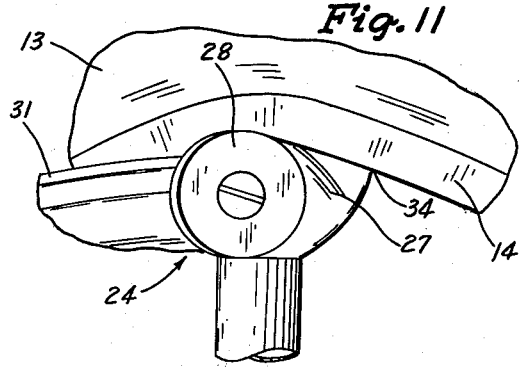
INVENTOR
JAMES R. FOSTER
BY
Lowell & Henderson
ATTORNEYS

United States Patent Office 3,125,152
Patented Mar. 17, 1964

3,125,152
TIRE MOUNTING APPARATUS
James R. Foster, Fort Dodge, Iowa, assignor to The Coats Company, Inc., Fort Dodge, Iowa, a corporation of Iowa
Filed June 8, 1961, Ser. No. 115,818
2 Claims. (Cl. 157—1.22)

This invention relates generally to tire handling apparatus and in particular to a tool for mounting a tire casing onto a wheel rim.

Although the assembly of a tire casing with a wheel rim is easily accomplished for about two-thirds the circumference of the tire casing, it is difficult to apply the remainder of the tire casing so as not to damage the beads of present day tubeless tires. It is, therefore, an object of this invention to provide an improved tire mounting tool which provides an easy and effective mounting of the tire, minimizing the chance of damage to a bead.

Another object of this invention is to provide a tire mounting tool having a rim engaging portion the surface of which gradually lifts a tire bead over the wheel rim.

Yet another object of this invention is to provide a tire mounting tool having a rim engaging portion for lifting a tire bead over the rim in advance of a roller for guiding the tire bead into the drop center of the rim.

It is a further object of this invention to provide a tire mounting tool capable of attaining the objects set forth hereinbefore which is economical to manufacture and effective in use.

Further objects, features and advantages of this invention will become apparent from the following description when taken in connection with the accompanying drawing wherein:

FIG. 3 is an enlarged, fragmentary plan view of FIG. 2;

FIG. 4 is a sectional view taken along the line 4—4 in FIG. 3;

FIG. 5 is a fragmentary plan view of the tire engaging or working end of the tire mounting tool;

FIG. 6 is a fragmentary front or end view of the tool;

FIG. 7 is a fragmentary view of one side of the tool;

FIGS. 8, 9, and 10 are cross sectional views taken as indicated, respectively, in FIG. 5; and FIG. 11 is a view similar to FIG. 3 showing the position of the bead near the end of a mounting operation.

Figure 1:
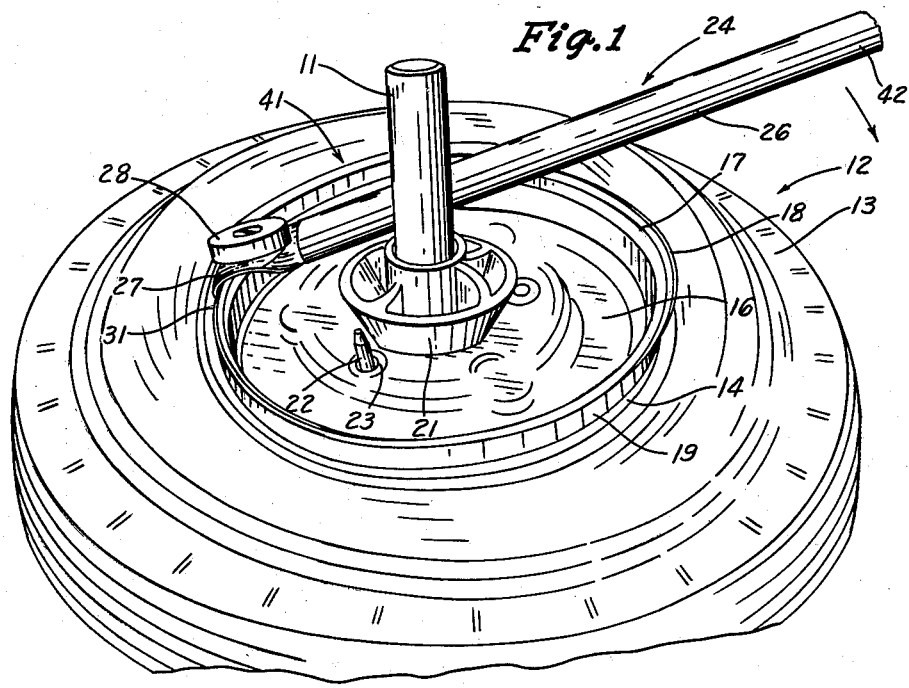
FIG. 1 is a perspective view of a portion of a tire handling machine with which the tire mounting tool of this invention is shown in use.

With reference to FIG. 1 of the drawing, there is illustrated a portion of an upright post 11 which is coaxial with and projected upwardly from a conventional tire handling machine (not shown), and which functions to center a wheel and tire assembly, designated generally as 12, on the machine. The tire casing 13 of the assembly 12 includes upper and lower beads, only the upper bead 14 being illustrated, and the wheel 16 includes the usual rim 17 having a pair of rim flanges 18 (only one showing) defining a rim well 19 therebetween. The tire handling machine is of a size to receive conventional vehicle wheels for twelve through sixteen inch tires.

The tire and wheel assembly 12 is maintained against rotation and movement laterally from a centered position on the machine by means including a clamping unit 21 operatively associated with the upright post 11, and by a holding pin 22 inserted through one of the usual screw openings 23 formed in the wheel 16.

The tire mounting tool of this invention, designated generally as 24 in FIG. 1, is used to mount or replace the tire casing 13 into the drop center 19 of the rim 17, prior to air under pressure being applied to the tire casing 13. The tool 24 comprises an elongated handle 26 having a bead engaging cam 27 secured at one end, and including a bead engaging roller 28 mounted on the cam 27.

As best shown in FIGS. 5 and 6, the cam 27 has an irregular shape in plan view, includes a smoothly rolled, hooked end 29 for engagement with the peripheral edge 31 (FIG. 4) of a rim flange 18, and has a leading edge 32 curving inwardly (FIG. 5) toward the handle 26. The end 29 and the leading edge 32 combine to give a fan-shaped appearance to the cam 27 in plan view. The hooked end 29 (FIG. 4) is adapted to overhang the peripheral edge 31 of the rim flange 18 and depends so as to be in a mating position with the inner side 30 of the rim flange 18.

In cross section, as best seen in FIGS. 8–10, the cam 27 is formed with a valley, indicated generally at 33, extending gradually downwardly from the top edge 34 of the hooked end 29 to the leading edge 32. In plan view, the valley 33 extends at about a forty-five degree angle (see FIG. 5) relative to the longitudinal axis of the handle 26. It is noted that from the floor of the valley 33, the floor being indicated by a full line 36 in FIGS. 8–10, to the top edge 34 of the hooked end 29, the surface of the cam 27 gradually slopes upwardly. The gradual upward slope of the leading edge 32 is clearly illustrated in FIG. 7.

For coaction with the cam 27, the bead engaging roller 28 is rotatably mounted on a portion 37 of the cam 27 by a pin or shaft 40. The roller 28 is positioned so that when the hooked end 29 is engaged with the rim peripheral edge 31 (FIGS. 3 and 4), the periphery 38 of the roller 28 extends beyond the edge 31. Additionally, the axis of rotation of the roller 28 (FIG. 6) is inclined at an acute angle relative to the plane of the cam top edge 34 so that the plane of the roller surface 39 is also so inclined.

Figure 2:
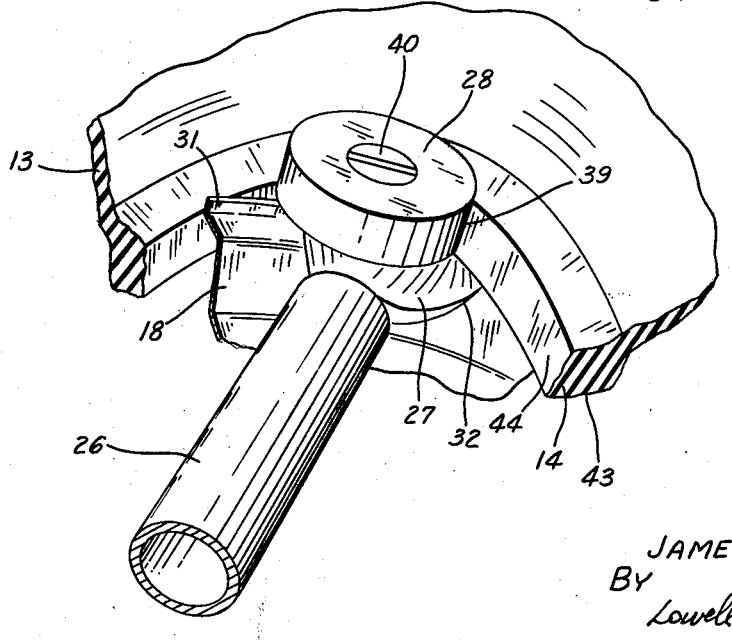
FIG. 2 is an enlarged, fragmentary perspective view of the tire engaging end of the tool, showing it in use.

To mount the tire casing 13 on the rim 17, the major portion of the bead 14 is easily manipulated into the rim well 19, but the remaining portion, indicated generally at 41 in FIG. 1, remains stretched over a corresponding portion of the rim flange 18. The mounting tool 24 is positioned with the hooked end 29 engaged with the rim peripheral edge 31 and with a portion of the bead 14 supported on the surface of the cam 27 (FIGS. 2 and 3). The handle 24 (FIG. 1) is fulcrumed against one side of the post 11, manually gripped at its outer end 42 and then rotated about the post, as a fulcrum, in the direction of the arrow in FIG. 1.

As the tool 24 is rotated, the inner edge 43 (FIG. 4) of the bead 14 is engaged by the leading edge 32 of the cam 27 and is gradually lifted up and over the rim peripheral edge 31 by means of the valley 33 formation on the surface of the cam 27. The movement of the bead 14 up and over the cam 27 is progressive and continues during movement of the mounting tool 24. Concurrently with this bead movement and subsequent to the lifting action of the cam 27, the bottom edge 44 (FIG. 4) of the bead 14 engages the peripheral surface 39 of the roller in a full line engagement, due to the inclination of the roller shaft 40, and is rollably guided by the roller 28 across the peripheral edge 31 and into the rim well 19.

As the mounting tool 24 continues to be rotated about the post 11, the leading edge 32 of the cam 27 progressively engages sequential portions of the bead 14 in advance of the roller 28 for lifting the portions from the interior of the rim flange 18 to a position spaced above the rim edge 31, thereby obviating contact of the rim edge 31 by the bead 14 and precluding damage to the bead 14.

As each portion of the bead 14 is lifted into engagement with the roller 28, the inclined movable surface 39 guides the bead bottom edge 44 on about the overhanging periphery 38 (FIG. 3) of the roller whereby the bead 14 is disposed outwardly and exteriorly of the rim flange 18. As the support of the cam surface ends at its rear end 46 (FIG. 5), the bead subsequently falls off the cam surface as it leaves the roller periphery 38 and is thereby displaced downwardly beneath the rim edge 31 and into the rim well 19.

Further rotation of the handle 26 results in the chordal distance of the bead arcuate portion 41, originally about one-third the inner circumference of the bead 14, decreasing with a concurrent increase in downward pull of the mounted portion of the tire casing 13. Thus, whereas the engagement of the bead inner edge 43 with the cam surface begins approximately with the floor 36 of the valley 33 (FIGS. 3 and 4), the engagement subsequently shifts in an arcuate manner on the fan-shaped cam surface toward the top edge 34 thereof. Referring to FIG. 11 which illustrates the position of the bead 14 shortly before the tire mounting tool 24 completes its movement, it is clearly seen that the bead 14 extends along the top edge 34 of the cam 27. At this point, the remaining unmounted portion of bead 14 snaps over the rim edge 31 due to the pull thereon by the remainder of the mounted tire casing 13.

Although only one preferred embodiment has been described herein, it is to be remembered that various modifications and alternate constructions can be made thereto without departing from the full scope of the invention as defined in the appended claims.

I claim:

1. A tool for mounting a tire casing on a wheel supported on a stand having an upright post projected outwardly from the center of the wheel, the wheel having a rim and the tire casing having beads, said tool comprising, handle means including an elongated member adapted to be fulcrumed against the post, a fan shaped member secured to one of said handle means in an axially offset position, one straight side of said fan shaped member defining the junction of the fan shaped member with said handle means, the other straight side of said fan shaped member being turned in to provide elongated hook means engageable with and overhanging the rim, said hook means extending laterally from said handle means and the end thereof at the junction of the handle means constituting the trailing end of the tool, the third or arcuate side of the fan shaped member extending from the handle means to the free end of the laterally extending hook means and constituting the leading edge of the tool, cam means on the top surface of said fan shaped member over which a bead is slidable during movement of said tool, said cam means having a surface inclined upwardly from the arcuate leading edge of the tool toward the trailing end, a roller mounted on said fan shaped member above said top surface and in a trailing position relative to said leading edge, said roller being in a plane inclined downwardly toward the leading edge and of a size such that a peripheral portion thereof extends from the end of said arcuate side remote from the hook means to the trailing end of said tool, said roller engageable with a bead as it slides over the top surface of the cam member whereby to guide the bead over the trailing end of said tool to a position below the rim peripheral edge.

2. The tool as defined in claim 1 wherein said cam means includes an elongated concavity extending from said leading edge to a position adjacent the trailing end of the tool and said roller being of a size such that a line along the base of said elongated concavity is substantially tangent to that peripheral portion of the roller which extends from the end of the leading edge of the tool remote from the hook means to the trailing end of the tool.

References Cited in the file of this patent

UNITED STATES PATENTS

| | | |
|---|---|---|
| 834,908 | Hussey | Nov. 6, 1906 |
| 965,076 | Carle | July 19, 1910 |
| 1,307,131 | Kimbel | June 17, 1919 |
| 2,888,064 | Coxworth | May 26, 1959 |
| 2,974,722 | Twilford | Mar. 14, 1961 |